United States Patent Office 3,233,421
Patented Feb. 8, 1966

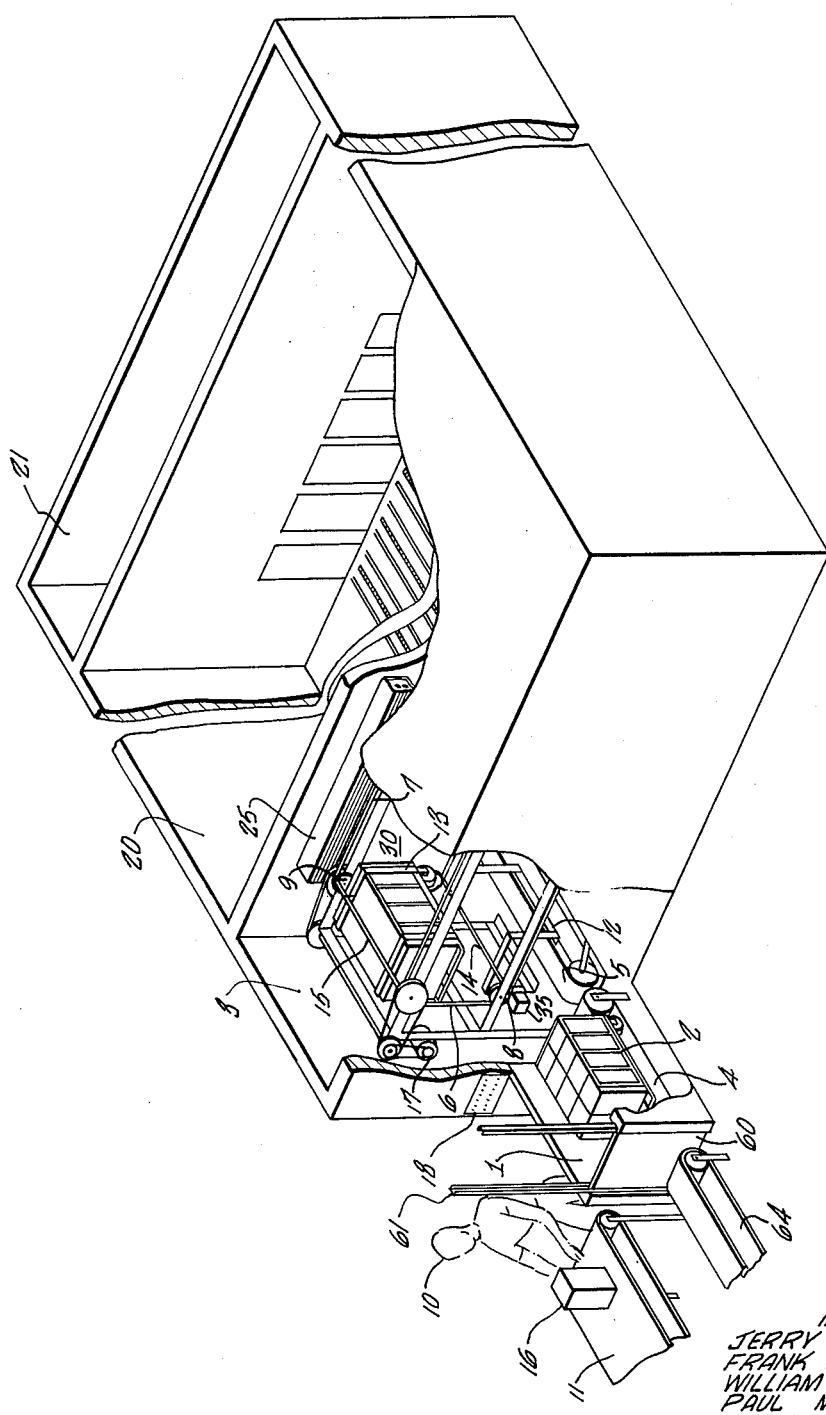

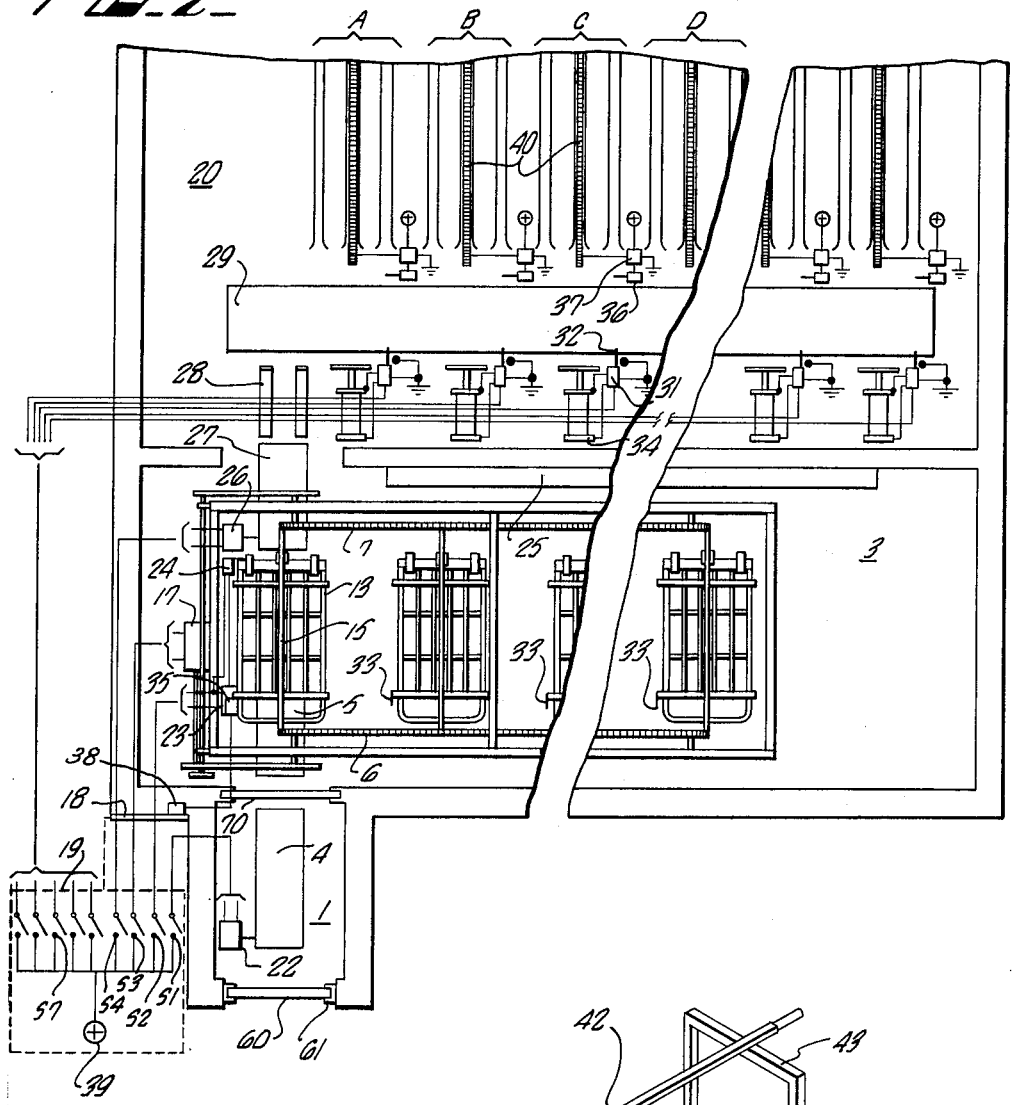
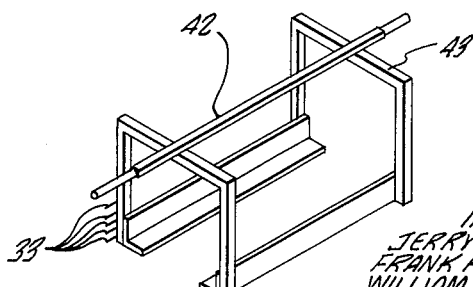

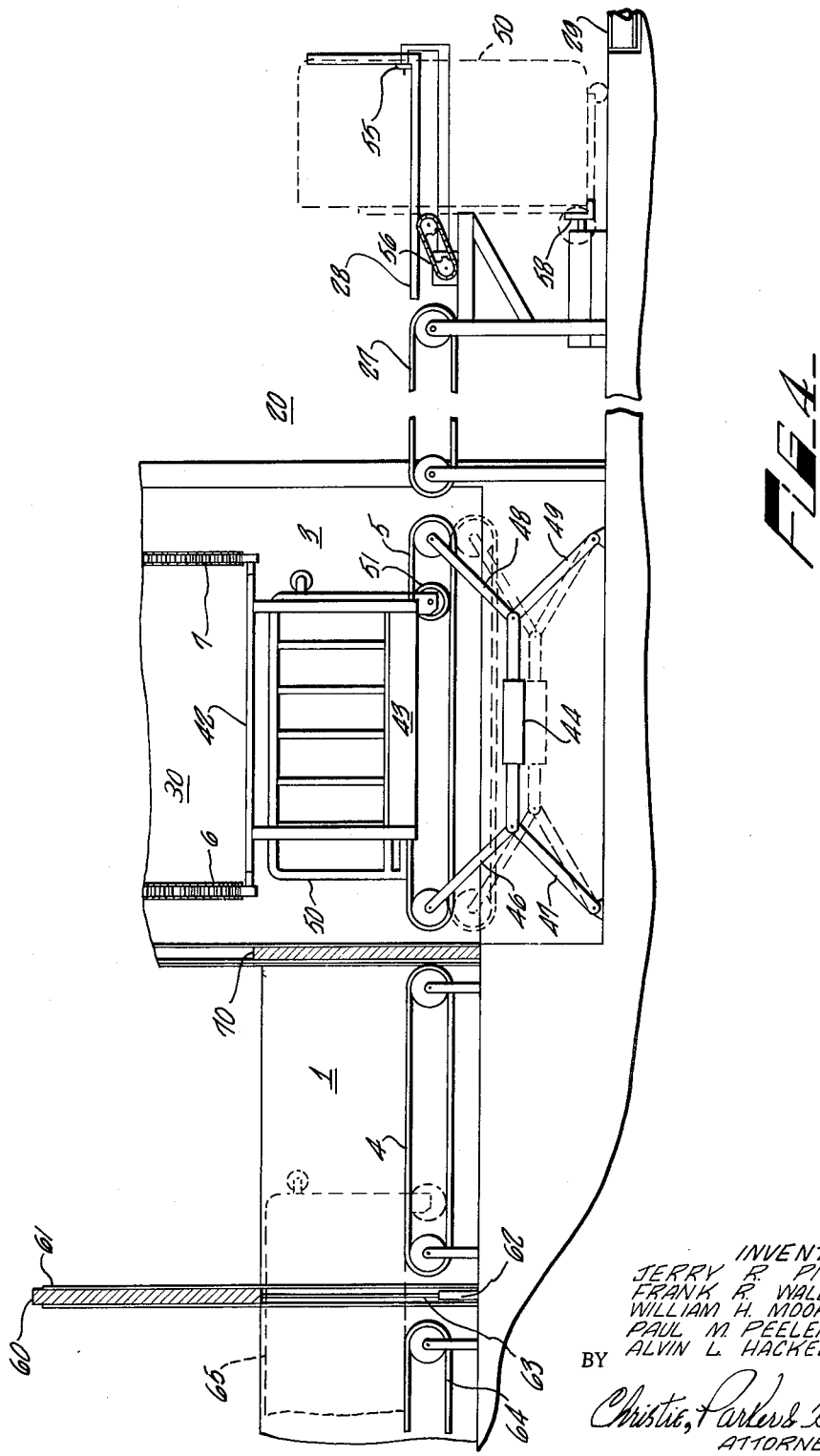

3,233,421
SYSTEM FOR TRANSFERRING ARTICLES
Jerry R. Pittman, Glendora, Frank R. Wallingford, Whittier, William H. Moore, Pasadena, Paul M. Peeler, Bell, and Alvin L. Hackelton, City of Commerce, Calif., assignors to Moore & Hanks Co., El Monte, Calif., a partnership
Filed Oct. 26, 1962, Ser. No. 233,223
8 Claims. (Cl. 62—63)

This invention relates to systems for transferring articles from one location to another, and it is particularly useful for transferring articles from one environment to another environment, such as the manufacture of ice cream wherein cartons of the unfinished product are transferred to one location to harden and to another location for storage prior to delivery to retail outlets.

In the manufacture of a product where temperature differentials are employed, it is often the case that one of the temperatures is either at an extreme cold or an extreme heat. For example, in the manufacture of bricks it is known that the kilns are operated at an extremely high temperature to bake the clay to produce the bricks. Conversely, in the manufacture of ice cream, an extremely cold temperature is employed to freeze or harden the ice cream to form the solidified finished product.

Whenever the stage of manufacture employing the temperature extremes is manual, it is necessary for men to come in contact with the extreme temperature environment. Such an environment is not healthy and often requires extra remuneration to the man working therein.

An example of an extreme temperature environment is found in the hardening stage in the manufacture of ice cream and usually involves a temperature of around 40° below zero Fahrenheit. The men working in this environment have to wear heavy clothing and are often appropriately called "Eskimos." In the ice cream industry the Eskimos are employed to take the finished product from the hardening area, to sort it according to orders and to place them into some sort of container, such as a wheeled cart. Because of the extreme cold, these men can only work for short intervals of time at the job of sorting and placing the finished product into containers.

Additionally, in these industries which employ the temperature differential in the process of manufacture, the method of subjecting the unfinished product to the extreme temperature involves an apparatus which requires a very large area. An example of such an apparatus is the roller bed employed in the ice cream industry, wherein the unfinished product is conveyed through the hardening or freezing area in separate containers on an expensive roller bed, which requires a large surface area.

Thus, in these industries, it would be desirable to be able to remove the men from the area of extreme temperature, to reduce the area of extreme temperature since the expense of creating the temperature differential is directly dependent upon the space involved, and, in general, to fully automate the stage of manufacture wherein the temperature differentials are employed.

Therefore, in accordance with the invention, there is provided a first area for loading a plurality of containers of an unfinished product into a large container and a conveyor for transferring the large loaded container from the first area into a second area, which is at an extreme temperature. The second area contains a device for producing the extreme temperature which operates upon the product as a step in the process of manufacture. The second area also contains a device for continuously passing the loaded container in close proximity to the extreme temperature producing device so that the area required for the hardening process is reduced. Further, for complete automation, there is included a third area wherein the containers of finished product are automatically sorted and stored. The third area contains a conveyor for transferring the finished product from the second area into the third area, and means for automatically placing the containers of finished product into selected areas.

Although the invention is useful, in general, in industries utilizing temperature differentials, it has particular applicability to the manufacture of ice cream where the temperature of concern is an extreme cold. In accordance with the invention, the process of solidification in the manufacture of ice cream is automated and comprises the steps of loading a large container with the semi-solid product while in a first area of relative warmth, transferring the loaded container into a second area having an extremely cold temperature, placing the loaded container on a conveyor in the second area, conveying the loaded container in a continuous loop in the second area, blowing air from a refrigeration unit at a temperature of approximately 40° below zero Fahrenheit on the loaded container as it passes through the second area, removing the loaded container of finished product from the conveyor at a preselected point along the loop path of the conveyor, and transferring the finished product in the loaded container from the second area into a third area where it is automatically sorted and stored.

The process of solidification or hardening in the manufacture of the ice cream is carried out, in accordance with the invention, by an apparatus which comprises a first area having a temperature of approximately 25° Fahrenheit. The first area is enclosed on all sides and is open at the top to permit easy loading of a container, such as a wheeled cart, with the unfinished product. The apparatus further comprises a second area of restricted space having a temperature of approximately 40° below zero Fahrenheit and containing a conveyor comprising a pair of parallel chains forming a loop around corner sprockets and supported in the horizontal plane by intermediate rollers, a plurality of pintle pins having their longitudinal axis in the horizontal planes and joining the chains at selected intervals around the loop, and a plurality of cages or carriers having open ends and being supported and connected to the chains by one of the pintle pins. The second area further contains a refrigeration unit and a blower for solidifying the product by convection currents as the product is conveyed in a continuous loop through the second area. There is additionally a third area where the finished product is sorted and stored after it has hardened in the second area. The third area contains a conveyor for transferring the loaded container of finished product from the second area into the third area and another conveyor for transferring the loaded container from the unloading point to selected storage points.

The above and other features and advantages of the present invention will be more clearly understood upon consideration of the following specification and drawing of which:

FIG. 1 is a pictorial diagram, partially cut away, of an apparatus for hardening and storing the product in the manufacture of ice cream, in accordance with the invention;

FIG. 2 is a detailed plan view of the apparatus shown in FIG. 1;

FIG. 3 is a detailed drawing of the carrier part of the conveyor of FIG. 1; and

FIG. 4 is a detailed side view of the loading and unloading portion of the apparatus shown in FIG. 1.

The apparatus of FIG. 1 is particularly adapted to the manufacture of ice cream which involves the hardening or solidification of the product prior to the storing and the subsequent transporting of the finished product to the consumers. Therefore, in accordance with the invention, the apparatus of FIG. 1 includes a loading area 1 which is enclosed on three sides and open at the top. An operator 10 for this stage in the manufacture of the ice cream will take the unfinished product supplied to him in a small container 16 on a conveyor 11 and will insert it in a large container 2, which may advantageously be the same wheeled cart, which carries the product to the retailer. The loading area 1 is at a temperature of approximately 25° Fahrenheit and, therefore, may be open at the top because the cool air will not readily escape in the upward direction. Thus, the operator 10 may easily place the unfinished product in the container 2 through the top of area 1.

The apparatus further comprises a hardening area 3 which is maintained at a temperature of approximately 40° below zero Fahrenheit. When the operator 10 has completed the loading of the container 2, he will close a selected switch on a control panel 18 to activate a conveyor 4, which is located in the loading area 1, and a conveyor 5, which is located in the hardening area 3. The loaded container will thus be transferred into the hardening area.

The hardening area 3 includes a conveyor 30 which traverses a closed loop. The conveyor 30 comprises chains 6 and 7 which travel along parallel paths and form a closed loop about corner sprockets, which are representatively shown by sprocket 8, along which chain 6 travels, and sprocket 9, along which chain 7 travels. The conveyor 30 further comprises carriers, of which carriers 12 and 13 are typical. The carriers 12 and 13 are supported and attached to chains 6 and 7 by pintle pins 14 and 15, respectively. This closed loop conveyor 30 is driven by motor 17 through a combination of pulleys and belts, as shown in the drawing. However, it is to be noted that this closed loop conveyor could also be driven by motor 17 through a combination of gears.

The movement of the conveyor 30 is such that the carriers 12 and 13 remain in an upright position, as shown, at all times. The conveyor may move in a clockwise or a counterclockwise direction. However, for illustrative purposes, it will be assumed that it is moving in a clockwise direction. Therefore, the top portion of conveyor 30 moves from left to right in FIG. 1 while the bottom portion moves from right to left. At the ends of the conveyor 30 the carriers will move vertically.

The closed loop conveyor 30 is shown as having a majority of its travel in the horizontal plane. However, if the space limitations and requirements do not permit the extended horizontal travel of the closed loop conveyor in the hardening area 3, it, of course, may be made to travel in a vertical direction as an alternative operation which is within the teaching and principles of this invention. Thus, one of the advantages of the closed loop conveyor becomes apparent in that its is flexible to meet the area limitations of each particular manufacturing plant. The closed loop conveyor may thus be made to travel a plurality of stories in the vertical direction as well as along a limited horizontal path, when the horizontal area is restricted.

The closed loop conveyor 30 is, in general, two chains which are parallel and run over sprockets and may thus form any closed loop configuration to conform to any particular space problem. Another particular advantage of such a construction for the conveyor in the hardening area is that it requires much less space than does the roller bed type construction of the prior art. Thus, a smaller required space for the conveyor permits the hardening area to be smaller with a consequent reduction in cost for refrigeration.

A refrigeration unit 25 is attached to the upper portion of one of the longer walls in the hardening area 3. The refrigeration unit 25 extends along the length of conveyor 30 and employs fans to blow the cold air on to and through the containers of unfinished product as they are conveyed along in the carriers of conveyor 30. The cold air from the refrigeration unit 25 will settle to the bottom of the hardening area 3 and will continue the hardening process while the containers are traversing the bottom portion of the closed loop of conveyor 30. The utilization of the two layers for hardening is another advantage of the use of the closed loop conveyor. It is to be noted that, if the conveyor 30 were constructed to travel in a vertical direction rather than a horizontal direction, the refrigeration unit 25 would be placed in a vertical position in close proximity to and running the length of the conveyor 30.

The apparatus also comprises an indexing and storing area 20 to which the finished product is transferred from the hardening area 3. In the indexing and storing area 20 the containers of finished product are remotely indexed and stored in selected areas. The details of the indexing and selective storing devices are shown in and will be described in conjunction with FIG. 2.

The apparatus further comprises a makeup room 21 which is maintained at a temperature of approximately 25° Fahrenheit. Since the temperature of the makeup room is not at an extreme cold, men may easily work in this room to transfer the loaded containers of frozen product from the indexing and storing area 20 to the trucks, which will transport the finished product to the consumer.

The operation of the hardening and storing apparatus of FIG. 1 may be better understood in conjunction with the detailed drawing of FIG. 2. The devices of FIG. 1, which are shown in FIG. 2, have the same reference numbers in FIG. 2.

The operator 10 and the conveyor 11, which supplies the operator with the unfinished product, are not shown in FIG. 2 in order to more clearly disclose the apparatus and its operation, in accordance with the invention. Thus, a plurality of switches, enclosed by dotted line 19 in FIG. 2, are shown in the operator's position of operation; but, it is noted that they are actually enclosed in control panel 18 on the side of the wall next to the operator's position.

The operator 10 will insert a large container, not shown in FIG. 2, into the loading area 1 and will proceed to fill it with individual containers 16 of the unfinished product. The large container may be a wheeled cart, a side view of which is shown in detail in FIG. 4, or it may be an ordinary cardboard box with sufficient holes in it so that the cold air may circulate throughout the container. The operator may advantageously select and fill the container that will be delivered to the retailer, thereby doing away with the Eskimo and making the operation less costly. Upon the completion of the filling of the container, the operator will close switches S1 and S2, thus activating a motor 22 and a motor 23, respectively. Motor 22 is coupled to conveyor 4 and will cause the loaded container to move from the loading area 1 into the hardening area 3. The motor 23 is coupled to conveyor 5 and will cause conveyor 5 to pull the loaded container into the desired position within hardening area 3. The conveyor 5 will cease to run when the loaded container is in the desired position because the loaded container will activate a microswitch 24, which will open the circuit to motor 23. When the loaded container is in position on the closed loop conveyor 30 in the hardening area 3, the operator 10 will close switch S3 to activate motor 17 to cause the closed loop conveyor 30 to move the loaded cart vertically from the position of loading into the hardening area to be further processed. The closed loop conveyor will then bring another carrier from the right into position above conveyor 5 so that another loaded container may be transferred from loading area 1 to hardening area 3. When the loaded container has been removed from conveyor 4 into the hardening area 3, the operator will open switches S1 and S2 to stop the movement of the conveyors and to prepare for the loading of another container.

Each carrier of conveyor 30 must be identifiable to the operator so that the finished product may be properly indexed and stored. For example, if 3 carriers held containers of chocolate ice cream, 4 carriers held containers of vanilla ice cream, and every other carrier held containers of other flavors of ice cream, the containers could not be automatically indexed and stored unless their location was known. Therefore, a thermopane window (not shown in the drawing) is provided in the wall between the loading area 1 and the hardening area 3 at the loading spot immediately above conveyor 4. Thus, with proper markings on each carrier the operator may identify the carrier by looking through the window and then may note on a record the carrier number and the flavor of ice cream it holds.

However, if the installation does not permit the use of a thermopane window, it is possible to automatically identify each carrier by the use of well-known computer circuits. For example, as shown in FIG. 3, each carrier will have attached to one side some unique combination of tabs 33 at selected heights on the carrier. As the carrier moves from right to left along the bottom path of conveyor 30 and upon arrival at the loading or unloading position, the tabs 33 will come into contact with a sensor 35 (FIG. 2). Sensor 35 contains a plurality of switches at elevations that match the height of tabs 33 on the carriers. As the sensor 35 comes into contact with the carrier and its unique combination of tabs, it will send the information to an encoder 38 (FIG. 2), which is associated with control panel 18.

If the presence or absence of 5 tabs on each carrier in a unique combination is employed, the encoder 38 will have 5 input leads, which is termed in the computer art, a 5 bit input. The encoder will have as many output leads as there are carriers on conveyor 30. Each output lead goes to a particular light on control panel 18, which is assigned a number in correspondence to a carrier. Therefore, as a carrier moves into the loading position and makes contact with sensor 35 its associated light on control panel 18 will light.

If desired, the conveyor 30 may be made sufficiently long and the refrigeration unit 25 sufficiently large to freeze the product during the time it takes a carrier to complete one loop and to return to the loading position. For such a design it would then be possible to eject the container of finished product from the carrier and successively load a container of unfinished product.

On the other hand, the manufacturing stages ahead of the hardening stage may not be sufficiently fast for continuous operation or the physical area alloted for the hardening plant may not be large enough for the hardening apparatus required for continuous operation. Thus, it would be necessary to fill some or all of the carriers and to set the conveyor 30 on an automatic cycle so that the carriers holding the loaded containers would be continuously passed in front of the refrigeration unit 25 for hardening.

Thereafter, at the completion of the hardening process, the operator will selectively unload conveyor 30. The operator, upon selecting the carrier to be unloaded, will stop the closed loop conveyor 30 by opening the switch S3 to motor 17. The operator will then close switch S4 and switch S2, which operate motors 26 and 23, respectively. Motor 23 will activate conveyor 5 to transport the loaded container from the hardening area 3 on to a conveyor 27, which is activated by motor 26. The loaded container will then be transferred from conveyor 27 to turning forks 28. The turning forks 28 are employed to place the container in an upright position after it is removed from the hardening area 3.

The container, in its upright position, will then be pushed by a pusher, not shown in FIG. 2 but detailed in FIG. 4 as a hydraulic pusher 58, on to an indexing conveyor 29. The operator selects the isle of a plurality of selectable isles in which the container is to be placed for immediate storage and subsequent delivery to a routeman's truck for transportation to the consumer.

The plurality of isles in the indexing and storing area 20 are lettered for identification. If the operator selects isle C, for example, for this particular loaded container of finished product he will close switch S7 which will apply a positive polarity from a source 39 to a microswitch 31 located at the head end of isle C. Thereafter, as the loaded container travels from left to right on the indexing conveyor 29, it will come in contact with the movable arm 32 of switch 31 and will activate this switch to stop the indexing conveyor at that point and to initiate the operation of a hydraulic pusher 34. The hydraulic pusher 34 will push the loaded container from the indexing conveyor 29 on to isle C, where the container will come in contact with a switch 36. The contact of the container with switch 36 will activate switch 36 which will close a circuit through a motor 37. Motor 37 is mechanically connected to a conveyor 40 located in the center channel of isle C. Conveyor 40 will thereafter pull the loaded container down isle C to the selected place of storage.

For a clearer understanding of the operation of the apparatus, the loading and unloading of the closed loop conveyor 30 in the hardening area 3 is shown in greater detail in FIG. 4, which is a side view of the conveyors involved. On the left in FIG. 4 is the loading area 1 including conveyor 4. Proceeding to the right; there is shown conveyor 5 and a portion of conveyor 30 in hardening area 3 and the conveyor 27 and turning fork 28 in the sorting and storing area 20.

The loaded container is transferred from the loading area 1 into the hardening area 3. Conveyor 5, which is of adjustable height, will then be lowered so that the loaded container will rest on the supports of a carrier 43, shown in detail in FIG. 3. Conveyor 5 is lowered and raised by the action of a hydraulic piston 44 and the scissor action of support arms 46 through 49.

It is seen from FIG. 4 that when a wheeled container 50 is employed, the conveyor 5 is lowered to the position outlined by the dotted lines, so that, as the closed loop conveyor 30 moves the carrier 43 in a horizontal direction into the loading or unloading position, the wheels (of which one wheel 51 is shown) of the cart will clear the conveyor 5.

The unloading of the closed loop conveyor in the hardening area 3 requires that the conveyor 5 again be placed in its raised position to lift the loaded container from carrier 43 and to transfer it from the hardening area 3 into the indexing and storing area 20 where it will be placed on conveyor 27. Although not shown, automation could be incorporated to unload the continuous loop conveyor. This could be done by the operator activating the switch supplying current to a microswitch to be tripped by the large container to be unloaded. The large container tripping this microswitch would stop the loop conveyor and activate the scissor action of the unloader as defined. The unloader at the end of its upward travel under the cart to be removed could again change the circuit to conveyors 5 and 27 to transfer container 50 to conveyor 27. In the alternative, the unloading process may be completely controlled by the operator, wherein conveyor 5 is first raised to the same level as conveyor 27 by the activation of hydraulic piston 44. The operator then activates both conveyors 5 and 27 to transfer the container 50 to conveyor 27 and on to a turning fork 28. As the loaded container slides on to the turning fork 28, it will engage a microswitch 55 at the bottom of the turning fork 28. Microswitch 55 activates a motor 56, which operates to place the turning fork in a vertical position, as shown by the dashed lines. As the turning fork 28 is placed in a vertical position, the loaded container, such as a wheeled cart, is also placed in an upright position for easier maneuverability. As the container moves into its upright position, as shown in dashed lines, it will trip a switch (not shown but activated by the weight of the loaded container) to engage a hydraulic pusher 58, which will push the loaded container from the turning fork 28 on to an indexing conveyor 29. The removal of the container from the turning fork will deactivate the microswitch 55. The motor 56 will then reverse its direction to again place the turning fork in its horizontal position, thereby readying it for the acceptance of another loaded container from the hardening area 3.

It is noted that wherever electrical motors are shown in the drawing, they could be replaced by hydraulic motors. In particular, motor 56, which operates the turning fork 28, could be advantageously replaced by a hydraulic piston and a rack and pinion gear combination. The use of hydraulic systems may be desired because of less heat generation.

An alternative method of inserting the large container in the loading area 1 is also shown in detail in FIG. 4. Rather than having the operator lift the large container or wheeled cart into the loading area 1 through the top, there is provided a conveyor 64, outside the loading area 1 and in line with conveyor 4. The large container, which is shown as a wheeled cart 65, will be inserted into the loading area 1 by the opening of a door 60 in the end of the area adjacent to the conveyor 64 and the application of power to conveyors 4 and 64. The door 60 is raised by a piston 63 upon the activation of an air cylinder 62.

The loading area 1 has an environment of sufficient cold to keep the unfinished products that are placed therein from spoiling. An advantageous way of providing the cold environment for area 1 is to permit some of the cold air from the hardening area 3 to escape into the loading area 1. Therefore, it is desirable to have an opening between the loading area 1 and the hardening area 3 during the time that the large container is being loaded by the operator. Thus, between the two areas there is a door 70 which opens and closes in the vertical direction to permit the flow of the cold air between the areas. Door 70 has an associated air cylinder and piston, which are not shown, but are identical to those shown for door 60.

It is noted that when the door 60 is in its raised position, the cold air in loading area 1 will escape into the outer area. Therefore, when the door 60 is raised, door 70 should be in its closed position so that there will not be a continuous flow of cold air from the hardening area 3. Therefore, in order to insure that both doors are not opened simultaneously, an interlock, which senses the air pressure to the cylinders, is provided to prevent the operation of an air cylinder when the other air cylinder is activated.

What is claimed is:

1. In combination, a first area for loading an unfinished product into a wheeled cart, the cart being in a prone position, a first conveyor located in the first area and raised above the floor level a predetermined amount, a second area for hardening the product, a second conveyor having an adjustable height with respect to the floor level and being contiguous to and operatively in line with the first conveyor so that a loaded cart is delivered from the first conveyor onto the second conveyor, a plurality of carriers in the second area attached to a pair of parallel chains guided by corner sprockets and driven by a motor in a continuous closed "O" shaped loop, a refrigeration unit in the second area, means for guiding the carriers in said closed "O" loop in close proximity to the refrigeration unit for hardening the product, a third area for selectively storing the loaded carts containing the finished product, a third conveyor located in the third area and being contiguous to and operatively in line with the second conveyor and transversely oriented with the closed "O" loop so that a loaded cart is delivered from the second conveyor to the third conveyor upon the unloading of the carriers, a rotary table located in the third area at the end of the third conveyor remote from the second conveyor for changing the loaded carts from a prone position to an upright position, a hydraulic pusher located beneath the rotary table for pushing the loaded cart in its upright position from the table, a fourth conveyor located in the third area for transporting the carts to selected isles in the third area, and means at each selected isle for transporting the cart to a desired storage area.

2. The process of subjecting a product to an extreme temperature for completion of manufacture comprising the steps of: loading wheeled carts with the unfinished product while in a first environment of normal room temperature, remotely transferring the loaded carts in a first direction into a second environment of extreme temperature, subjecting the unfinished product via a closed and continuously recycling loop transversely oriented with respect to said first direction and totally enclosed within the extreme temperature environment for a preselected number of cycles to provide a finished product, remotely transferring the carts of finished product from the second environment to a third environment, and transferring the loaded carts directly from the third environment to the vehicle for transportation to the consumer of the finished product.

3. The process of solidification in the manufacture of ice cream comprising the steps of: loading a container with the unfinished product while in a first area having a first environment, raising a conveyor in a second area having an environment of extreme cold, activating in combination a conveyor in the first area and the raised conveyor in the second area to transfer the loaded container into the second area, lowering the conveyor in the second area to place the loaded container on a carrier of a closed loop conveyor, identifying the carrier of the closed loop conveyor, recording the carrier's identification and the type of product in the loaded container, activating the closed loop conveyor for conveying the unfinished product in a closed loop in the second area past a refrigeration unit for hardening of the product, identifying each carrier to select the one to be unloaded, stopping the closed loop conveyor when the desired carrier is in the unloading position, raising the adjustable conveyor in the second area to lift the loaded container off the carrier, activating the conveyor in the second area and a conveyor in a third area having an environment of sufficient cold to store the finished product, conveying the loaded container of finished product into the third area, placing the loaded container in an upright position in the third area, placing the upright container on a conveyor in the third area, and transferring the loaded container to a preselected storage area.

4. A system for transferring articles from one location to another location comprising a plurality of portable carriers for receiving the articles, the carriers having wheels at one end and handle means at the other for use by persons to move the carrier, a continuous loop conveyor having means located along the loop for engaging the portable carriers, means for loading the carriers on the conveyor in a prone attitude, and means for selectively unloading the carriers from the conveyor and for erecting the carriers so that the wheels are at the lower end of the carriers and the carrier may be moved by hand for the distribution of the articles without requiring removal of the articles from the carriers.

5. A system for subjecting articles to a plurality of environments comprising a first compartment where the articles are assembled, a first slidable door arranged for opening and closing an entrance to the first compartment, a second compartment opening into the first, a second slidable door for opening and closing the opening between the first and second compartments, interlock means connected to the two doors to prevent them from opening simultaneously, means for creating an environment in the second compartment different from that in the first compartment, a closed loop conveyor in the second compartment, a first conveyor for carrying articles from the first compartment into the second compartment and in a direction transverse to the movement of all parts of the closed loop conveyor, means for transferring articles from the first conveyor to the closed loop conveyor so the articles are carried through the second compartment in a closed loop path, a third compartment opening into the second compartment, and means for moving articles from the closed loop conveyor in a direction transverse to the movement of all parts of the closed loop conveyor and into the third compartment.

6. The process of subjecting articles to different environments comprising the steps of: loading a container with the articles and placing the container on a conveyor in a first area having a first environment, raising an adjustable conveyor in a second area having a different environment, activating the conveyor in the first area and the raised conveyor in the second area to transfer the loaded container into the second area, lowering the conveyor in the second area to place the loaded container on a carrier of a closed loop conveyor, activating the closed loop conveyor for conveying the container in a closed loop in the second area, stopping the closed loop conveyor when a desired carrier is in an unloading position, raising the adjustable conveyor in the second area to lift the loaded container off the carrier, activating the conveyor in the second area and a conveyor in a third area having an environment different from that of the second area, and conveying the loaded container of articles into the third area.

7. The process of solidification in the manufacture of ice cream comprising the steps of: loading a container with the unfinished product while the container is in a prone position on a conveyor in a first area having a first environment, raising an adjustable conveyor in a second area having an environment of extreme cold, activating the conveyor in the first area and the raised conveyor in the second area to transfer the loaded container into the second area, lowering the conveyor in the second area to place the loaded container on a carrier of a closed loop conveyor, activating the closed loop conveyor for conveying the unfinished product in a closed loop in the second area past a refrigeration unit for hardening of the product, stopping the closed loop conveyor when the desired carrier is in an unloading position, raising the adjustable conveyor in the second area to lift the said desired loaded container off the carrier, activating the conveyor in the second area and a conveyor in a third area having an environment of sufficient cold to store the finished product, conveying the loaded container of finished product into the third area, placing the loaded container in an upright position in the third area, placing the upright container on a conveyor in the third area, and transferring the loaded container to a preselected storage area.

8. A system for transferring articles from one location to another location comprising a plurality of portable carriers for receiving the articles, the carriers having wheels at one end to expedite movement of the carrier, a closed loop conveyor having means located along the loop for engaging the portable carriers, means for loading the carriers on the conveyor in a prone attitude, means for unloading the carriers from the conveyor, and means for erecting the carriers so that the wheels are at the lower end of the carriers and the carriers may be rolled for the distribution of the articles without requiring removal of the articles from the carriers.

References Cited by the Examiner

UNITED STATES PATENTS

| 1,933,257 | 10/1933 | Goosmann | 62—78 |
| 2,196,643 | 4/1940 | Reeh | 62—380 X |
| 2,254,420 | 9/1941 | Cleveland | 62—380 |
| 2,263,452 | 11/1941 | Birdseye | 62—65 |
| 2,456,124 | 12/1948 | Hoffman | 62—63 |
| 2,489,918 | 11/1949 | Menges | 62—380 |
| 2,494,027 | 1/1950 | Anderson | 62—65 |
| 2,977,003 | 3/1961 | Muller | 214—11 |
| 3,022,636 | 2/1962 | Morrison | 62—380 |

EDWARD J. MICHAEL, *Primary Examiner*.